Aug. 11, 1936.  W. HARRIS  2,050,947
HAY BALER
Filed Jan. 14, 1935  3 Sheets-Sheet 1

Wilford Harris, INVENTOR
BY Victor J. Evans & Co.
ATTORNEY

Aug. 11, 1936.  W. HARRIS  2,050,947
HAY BALER
Filed Jan. 14, 1935  3 Sheets-Sheet 2
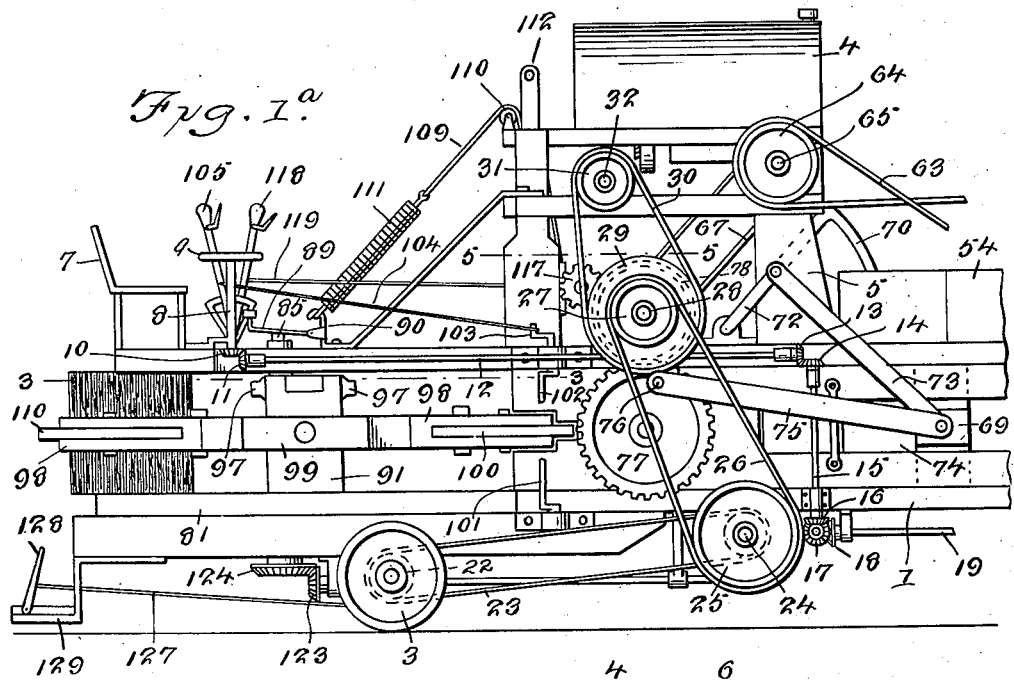
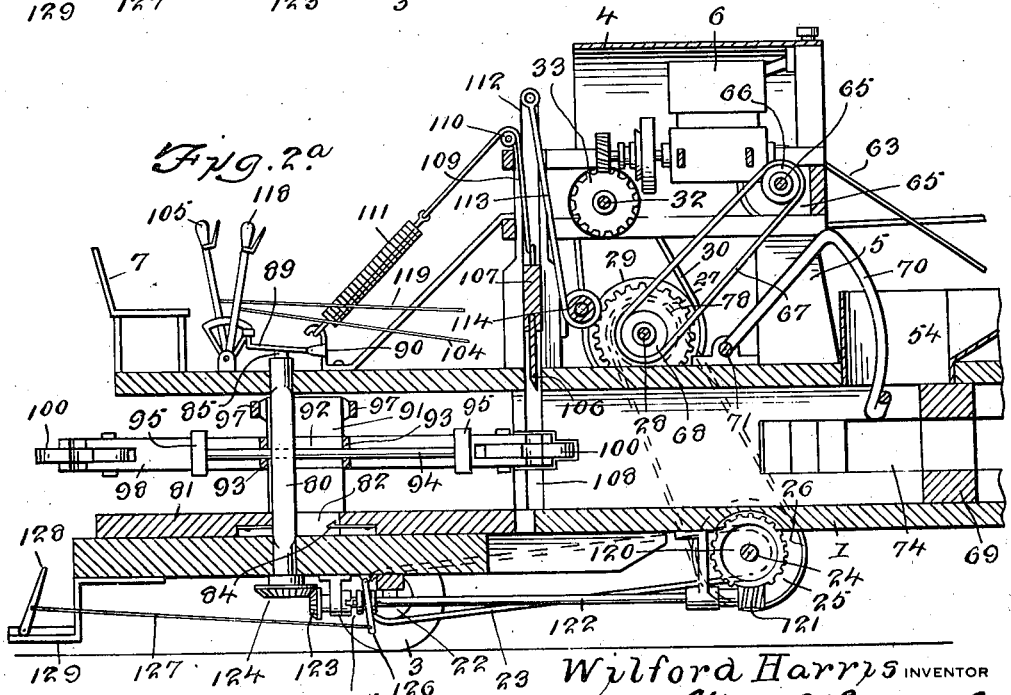
Wilford Harris INVENTOR
BY Victor J. Evans & Co.
ATTORNEY Aug. 11, 1936.  W. HARRIS  2,050,947
HAY BALER
Filed Jan. 14, 1935  3 Sheets-Sheet 3

Wilford Harris
INVENTOR

BY Victor J. Evans & Co.
ATTORNEY

Patented Aug. 11, 1936

2,050,947

UNITED STATES PATENT OFFICE 2,050,947

HAY BALER

Wilford Harris, Armorel, Ark., assignor of one-third to Walter Anderson, Armorel, Ark.

Application January 14, 1935, Serial No. 1,804

6 Claims. (Cl. 100—28)

The primary object of this invention is to provide a self-propelled machine which may be driven along a windrow of hay and automatically pick up the hay, deliver it to baling mechanism, and discharge the bale at the rear of the machine. It is also an object to provide a novel bale-shaping and discharging mechanism, and also to provide a novel arrangement of parts whereby the loose hay may be pressed into a shaping compartment, the formation of a new bale effecting discharge of a previously formed bale. These stated objects and other objects, which will appear in the course of the following description, are attained in such a machine as is illustrated in the accompanying drawings, and the invention resides in certain novel features which will be particularly defined in the appended claims.

In the drawings:

Figure 1a is a similar view of the rear portion of the machine.

Figure 2a is a longitudinal sectional view of the portion of the device shown in Fig. 1a.

Figure 3 is a horizontal section on the line 3—3 of Figure 1a.

Figure 5 is a section on the line 5—5 of Figure 1a.

Figure 6 is a detailed vertical section through the center of the rotary press.

Figure 1:
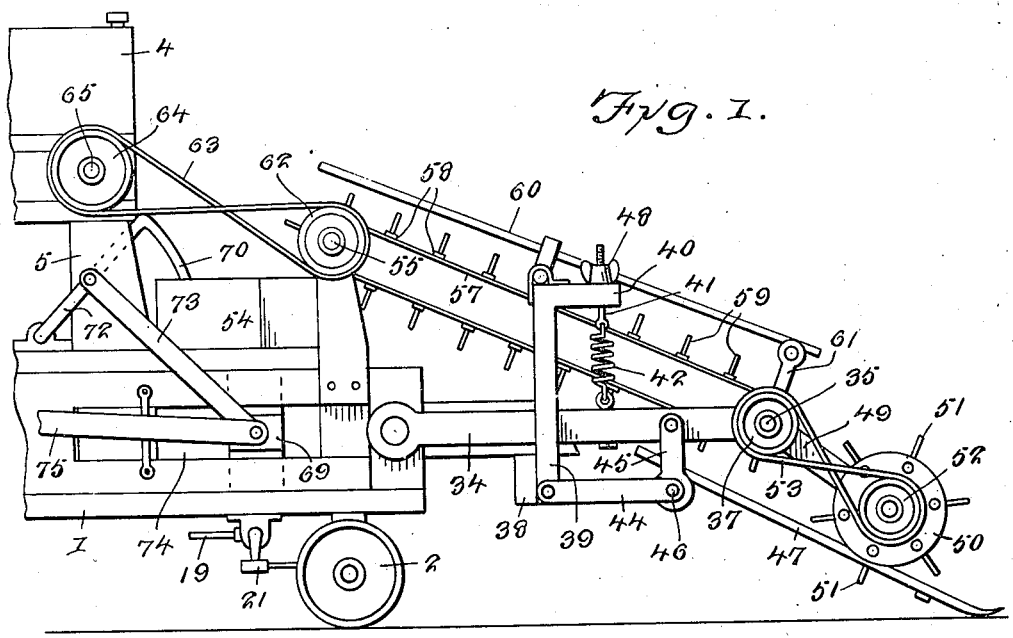
Figure 1 is a side elevation of the front portion of the machine.

The main frame 1 of the machine is a rectangular elongated open-ended box supported by steering wheels 2 at its front end and by driving wheels 3 at its rear end, and on top of the frame is a housing 4 on an upper frame 5, an internal combustion engine 6 being supported by said upper frame within the housing and constituting the source of power for all the moving parts. On the top of the main frame, at the rear thereof, is an operator's seat 7 adjacent which is a steering column 8 having a hand wheel 9 at its upper end and a beveled pinion 10 at its lower end. The pinion 10 meshes with a similar pinion 11 on the rear end of a shaft 12 which is mounted in a suitable bearings provided therefor on the main frame and extends forward to a point approximately midway the ends of the frame, its front end having a beveled pinion 13 secured thereon. The pinion 13 meshes with a pinion 14 on the upper end of a shaft 15 mounted vertically on the side of the frame and equipped with a pinion 16 at its lower end. The pinion 16 meshes with a pinion 17 on the end of a transverse shaft which is mounted on the bottom of the frame and operativelly connected by gearing, indicated at 18, with a rotatable steering rod 19 which extends forwardly beneath the frame and is connected with the steering wheels through linkage of any approved form indicated conventionally at 21. Through the described gearing and connections, the machine may be steered in the well-known manner of steering automobiles.

On the inner sides of the driving or propelling wheels 3 are secured pulleys 22 about which are trained belts 23 which are also trained about pulleys secured on a transverse shaft 24 mounted on the bottom of the frame. A pulley 25 is secured on each end of the shaft 24 at the side of the frame, and a belt 26 is trained about each of said pulleys and about each of a pair of pulleys 27 on opposite ends of the main shaft 28 which is suitably mounted on the main frame within the upper frame 5. Pulleys 29 are secured on the shaft 28 at the inner sides of the pulleys 27 and belts 30 are trained about the pulleys 29 and pulleys 31 on the ends of a transverse shaft 32 mounted on the frame 5 just below the engine shaft and connected with the engine shaft through worm gearing indicated at 3. It will thus be seen that the machine is driven over the field by power from the engine.

Figure 2:
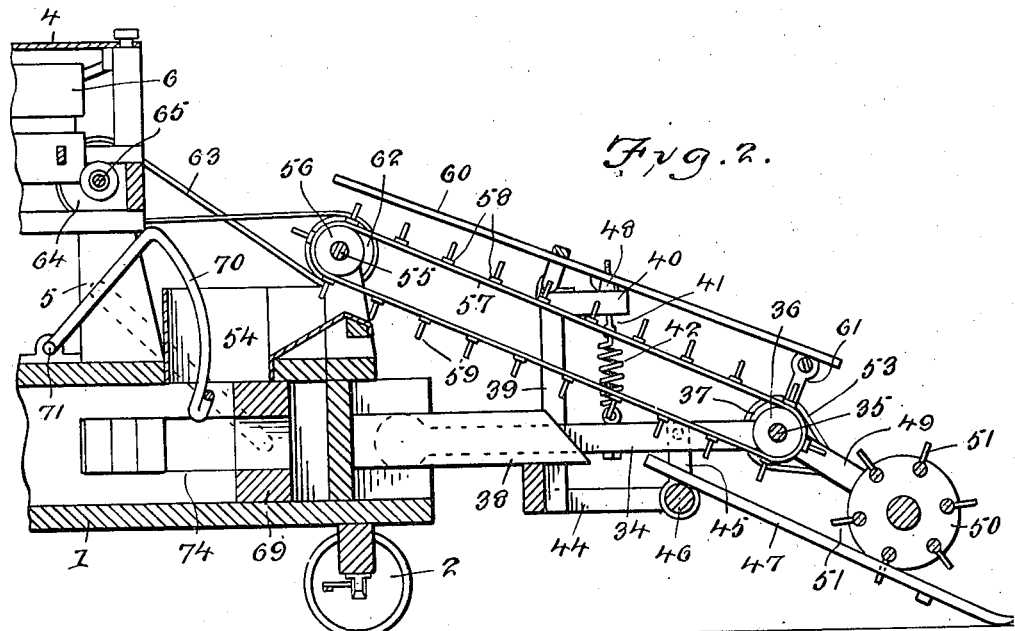
Figure 2 is a central vertical longitudinal section of the front portion of the machine.

Pivoted to and projecting forwardly from the front end of the main frame are arms 34, in the front ends of which is mounted a shaft 35 carrying a drum 36 between the arms 34 and pulleys 37 on its ends at the outer sides of the arms. A bracket or beam 38 is secured rigidly to the main frame and projects therefrom between the arms 34 and posts 39 are fixed to said bracket and rise therefrom at the outer sides of the arms 34, the posts being provided with lugs 40 at their upper ends. Mounted in said lugs are screw-eyes or similar hangers 41 in which are engaged the upper ends of springs 42 which have their lower ends attached to the arms 34, as shown in Figures 1 and 2, said arms being thus supported in such a manner that the vibration of the machine will not cause disruption of any of the working elements mounted on the arms. Pivoted to the bracket 38 at the lower ends of the posts 39 are short arms 44 and links 45 are pivoted to the front ends of said arms and to the arms 34, the pivots for the lower ends of the links being enlarged between the links and constituting a rock shaft 46. A rake or gathering fingers 47 is secured to and projects downwardly and forwardly from the shaft 46 to run upon the ground in advance of the machine and lift the hay. The rake is resiliently supported by the springs 42 with the arms 34 and wings nuts 48 on the screweyes 41 above the lugs 40 provide for adjustment of the spring tension to the load to be carried.

Arms 49 are pivoted upon the shaft 35 and extend forwardly and downwardly therefrom to carry a reel 50 comprising a drum rotatably mounted in and between the forward ends of said arms and teeth 51 on the drum arranged to work between the fingers of the rake and sweep the hay toward the upper rear end of the rake as the drum revolves. Pulleys 52 are secured to the ends of the drum and crossed belts 53 are trained about said pulleys and about the pulleys 37 so that the reel is driven from the shaft 35.

A hopper 54 is mounted on top of the main frame and a shaft 55, carrying a drum 56, is mounted above and at the front of the hopper. The drum 56 is like the drum 36 and an endless apron or conveyor belt 57 is trained around the drum, said apron having secured thereon spaced transverse slats 58 from which project teeth or pins 59 adapted to take into the hay lifted by the rake and the reel and convey the same to and deliver it into the hopper. It will be readily noted that the reel forces the hay toward the conveyor and the teeth on the latter readily enter the hay and lift it to the upper run of the conveyer by which it is carried to the hopper, guard rails 60, supported by the posts 39 and arms 61 rising from the bearings of the shaft 35, preventing the hay being thrown from the conveyer.

Pulleys 62 are secured on the ends of the shaft 53 and crossed belts 63 are trained about said pulleys and pulleys 64 to drive the conveyer and the reel, the conveyer apron functioning as a belt to transmit motion from the drum 56 to the drum 36. The pulleys 64 are fixed upon the ends of a shaft 65 which is mounted on the upper auxiliary frame 5 and has a pulley 66 secured thereon between its ends, a belt 67 being trained around said pulley and a pulley 68 on the main shaft 28.

Figures 5, 6:
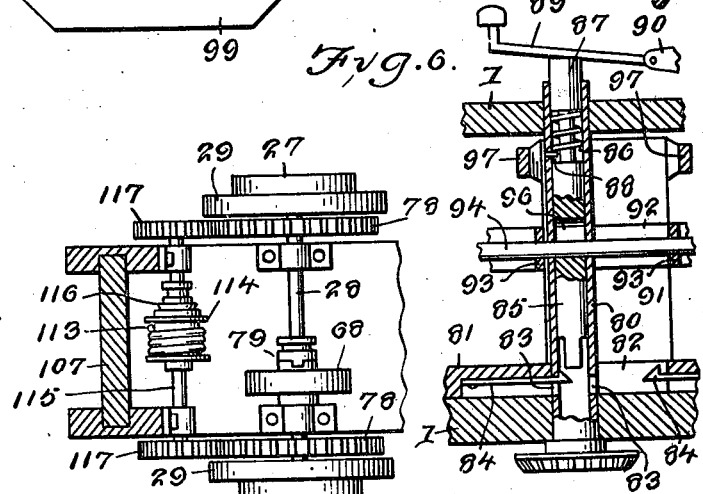

The hopper 54 has an open bottom and the hay fed into the hopper passes at once into the box or interior of the main frame immediately at the rear of a plunger 69 which fits closely but slidably in the frame, and a packer 70 works through the hopper to form the hay into a compact mass against the rear side of the plunger. The packer consists of a substantially V-shaped arm rising from a rock shaft 71 journaled in suitable bearings on the top of the main frame and having crank arms 72 on its ends. Links 73 have one end pivoted to the end of the respective crank arm 72 and the opposite end pivoted to the plunger, the box or main frame having longitudinal slots 74 in its sides to accommodate the pivots. Lower links 75 are pivoted at their front ends to the sides of the plunger and at their rear ends upon wrist pins 76 on the sides of gear wheels 77 mounted on the sides of the main frame below and in mesh with gear wheels 78 on the shaft 28, the packer and plunger being thus operated in unison and in proper relation to the hay-delivering conveyer. By referring to Figure 5, it will be understood that the pulley 68 from which motion is imparted to the conveyer is loose on the shaft 28 but may be locked thereto by a clutch 79, this arrangement permitting the conveyer to be held idle in the event that it should be feeding the hay too rapidly.

Figure 3:
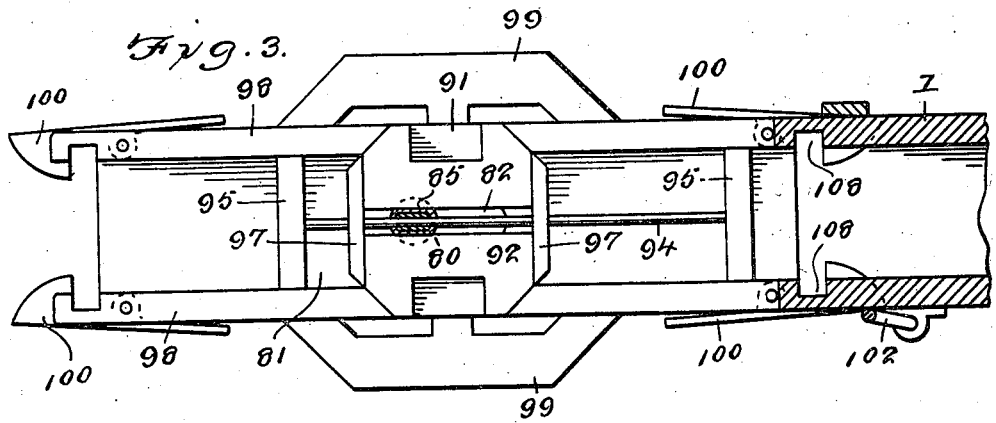
Figure 4:
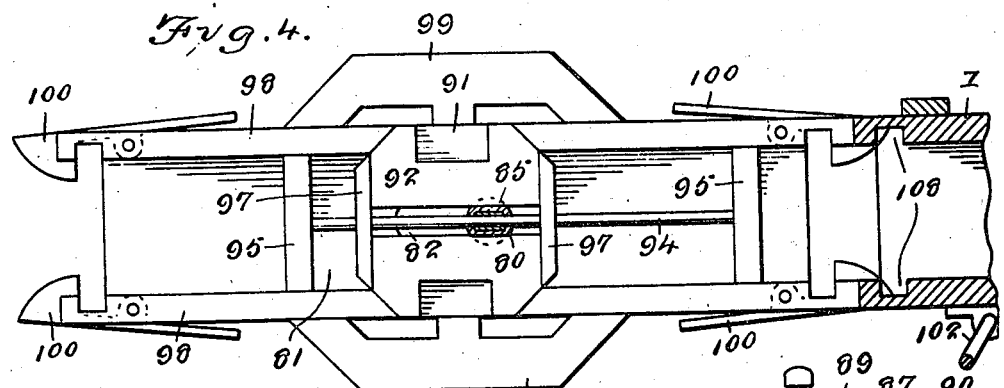
Figure 4 is a view, similar to Figure 3, with the parts in a slightly different position.

Mounted in the main frame, near the rear ends thereof, is a vertical hollow shaft 80 having flat sides between its ends, as best shown in Figures 2ª, 3 and 4. Said shaft passes through a turntable 81 and a slot 82 therein so that the turntable must turn with the shaft but may have a limited sliding movement across the shaft, as will be understood. Near the lower end of the shaft are opposite openings 83 and, at the opposite ends of the slot 82, the turntables carry latches 84, best shown in Figure 6, adapted to enter the respective notches and engage behind the wall of the shaft to lock the table against sliding movement. To release the latch, a tripping plunger 85 is mounted in the shaft and adapted to bear at its lower end upon the engaged latch to release the same, the plunger being normally held up above the latch by an expansion spring 86 coiled around the plunger between a shoulder 87 thereon and an abutment or rest 88 in the shaft. A pedal 89, pivoted to a bracket 90 on the top of the main frame, extends across the upper end of the plunger so that, when necessary, the plunger may be depressed against the action of the spring and its lower end caused to impinge upon and release the latch. In the operation of the machine, the hay is compressed and forced over onto the turntable until a bale is formed whereupon the table is turned through 180° to present a clear space to the press for receiving a second charge of hay, the previously formed bale being discharged at the rear of the machine as a second bale is formed. Rising from the sides of the turntable at the center thereof are standards 91 connected about midway their height by horizontal plates 92 and cleats 93, the plates being spaced apart at their inner opposed edges and the cleats being secured to the plates and spanning the space between them and having openings alined with said space to support and guide a rod 94 which passes through the space and has a follower 95 secured on each end, the plunger 85 having a slot 96 to accommodate the rod. The upper ends of the standards are connected by cleats 97. Side bars or rails 98 are secured to the standards and project forwardly and rearwardly therefrom to guide the followers 95 and laterally restrain the hay pressed between them. Reenforcements 99 are secured on the outer sides of the side bars at the centers of the same. In the ends of the side bars are mounted dogs 100 which are adapted to engage behind the pressed hay and hold it against re-expansion. To hold the dogs in engagement with the hay, a rock shaft 101 is mounted vertically on the side of the main frame and has a central crank 102 arranged to extend over and bear against the outer end of a dog, as will be understood upon reference to Figures 3 and 4. On the upper end of the rock shaft is a crank arm 103 which is connected by a connect-rod or link 104 with an operating lever 105 within convenient reach from the operator's seat 7. A pull on the lever locks the dogs in operative position while rocking the lever forwardly will rock the shaft 101 free of the dog so that the latter may release the hay. It will now be understood that the reciprocation of the plunger 69 presses the successive charges of hay rearwardly and into the space between the bars 98 and against the front follower 95 against which the hay is packed and compressed until a bale is formed.

The hay is then cut between the bale and the end of the main frame, the dogs released and after the bale is tied the turntable is rotated to bring the completed bale to the rear. As the successive charges of hay are compressed against the front follower, the two followers will be pushed rearwardly, the previously formed bale being moved rearwardly over the turntable. When the bale is formed, the operation of the machine may be stopped while the bale is tied and then again started. The pedal 89 is then depressed so that the latch 84 will be released, as has been described, and the turntable will then be moved rearwardly from the end of the main frame and the first formed bale will be discharged. The turntable is then rotated.

To cut the hay, a vertically movable knife 106 is provided. This knife is carried by a headlock 107 moving in grooves 108 in the main frame and suspended by a cable 109 which is trained over a guide roller 110 on the upper auxiliary frame and attached to a strong coiled spring 111 held by the bracket 90. Rising from the headblock is a tongue 112 attached to which is a cable 113 which, between its ends is wound on a windlass or drum 114, said drum being loose on a shaft 115 and adapted to be locked thereto by a clutch 116. Pinions 117 are secured on the ends of the shaft 115 and mesh with the gears 78 to rotate the shaft and the clutch is controlled by a lever 118 and suitable connections, part of which is shown at 119. When the knife is to operate, the clutch is closed whereupon the cable 113 will be wound on the drum 114 and the knife drawn downward and forced through the hay, the spring 111 being extended. When the clutch is opened, the spring will contract and pull upon the cable 109 to raise the knife.

Between the ends of the shaft 24 below the main frame, a worm gear 120 is secured thereon and said gear meshes with a worm 121 on the front end of a shaft 122 extending longitudinally and equipped at its rear end with a loosely mounted beveled pinion 123. The pinion 123 meshes with a gear 124 on the lower end of the shaft 80 to rotate the turntable and may be locked to the shaft 122 by a clutch 125 which is shifted by a lever 126 hung on the bottom of the main frame and connected by a link 127 with a hand lever 128 manipulated by an operator upon the platform 129 carried by the rear end of the main frame. When the clutch is open, the turntable will remain stationary to permit a bale to be formed, and when the clutch is closed, the turntable will be rocked to carry the formed bale to the rear and place the empty frame in position to receive hay for forming another bale.

Having described my invention, what I claim is:

1. A hay-baling machine including a bale-forming mechanism comprising side bars, followers slidably mounted between the side bars and coacting with the side bars to form two material receiving chambers, a rigid connection between the followers, means for pressing hay between the side bars against one of the followers, and a turn table supporting the side bars and followers and forming means for reversing the followers and side bars whereby to bring the opposite follower and ends of the side bars into hay-receiving position.

2. In a hay-baling machine, a bale-forming mechanism comprising a turntable, means for rotating the turntable at will, means mounting the turntable for limited sliding movement, means for holding the turntable against sliding, means for releasing said holding means, side bars mounted on the turntable, and followers slidably mounted between the side bars.

3. In a hay-baling machine, a frame, a bale-forming mechanism comprising side bars, plungers slidably mounted between the side bars, dogs mounted in the side bars to retain hay between the same, a rock shaft mounted on the frame adjacent the ends of the side bars and having a crank to bear upon the dogs, and means for operating said shaft to set the dogs.

4. In a hay-baling machine, a bale-forming mechanism comprising a hollow vertical shaft, a turntable rotatable with the shaft and having a slot through which the shaft passes whereby the turntable may slide across the shaft, latches at the ends of the slot to engage the shaft and hold the turntable against sliding movement, and means within the shaft to release the engaged latch.

5. In a hay-baling machine, a turntable, a shaft passing through the turntable and adapted to turn the same, standards on the turntable at opposite sides of the shaft, side bars secured to the standards and extending forwardly and rearwardly therefrom, connections between the standards and the side bars, followers slidably mounted between the side bars at the front and rear of the standards, and a rigid connecting rod secured to the followers and passing slidably through the shaft and the connections between the standards.

6. In a hay-baling machine, a turntable having a central slot, means for rotating the turntable at will, said means including a hollow shaft passing through the slot in the turntable whereby the turntable may have a limited sliding movement across the shaft, the shaft having opposite openings near its lower end, latches at the ends of the slot in the turntable arranged to enter the respective openings in the shaft and lock the turntable thereto, a trip plunger in the shaft, yieldable means normally holding the plunger raised, and means acting on the upper end of the plunger to depress the same and release the engaged latch.

WILFORD HARRIS.